Dec. 24, 1968  J. R. ALBERT ETAL  3,417,432
APPARATUS FOR EXTRUDING COMPOSITE BLOW MOLDING PARISONS
Filed Aug. 27, 1965  4 Sheets-Sheet 1
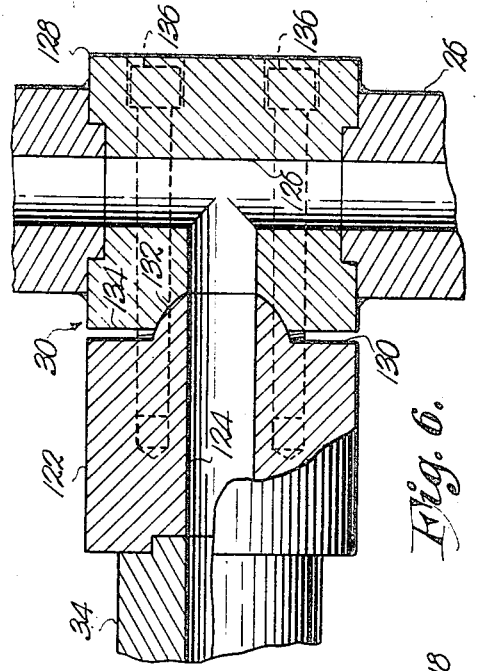
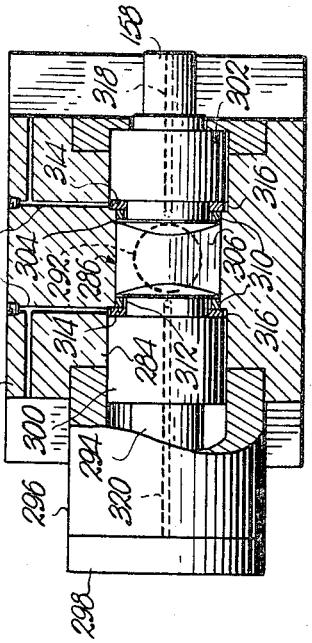
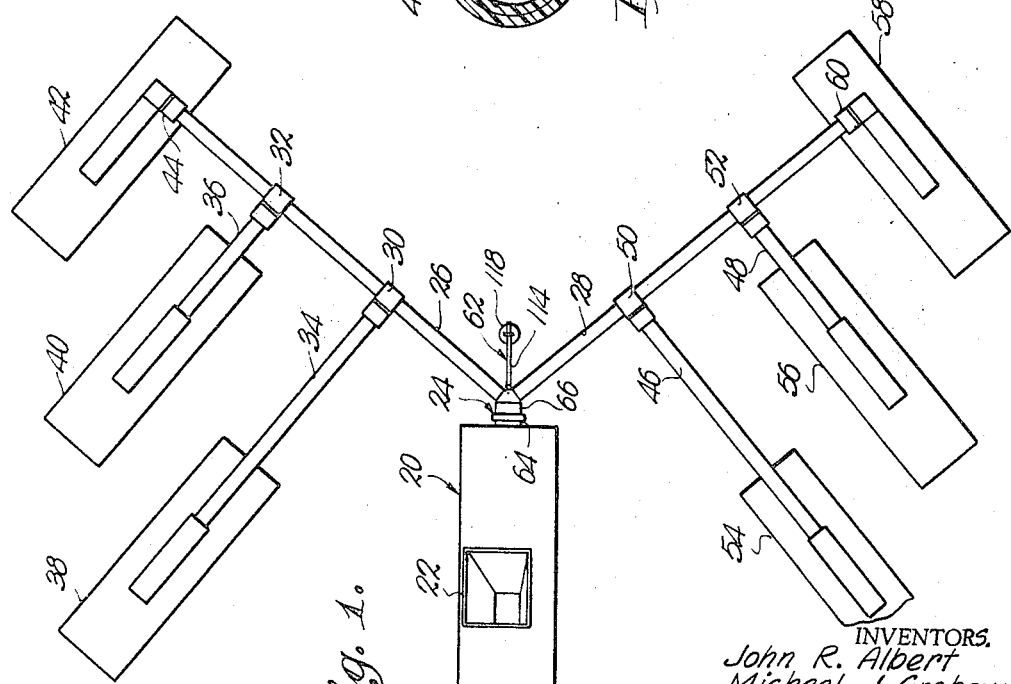
INVENTORS.
John R. Albert
Michael J. Grebowiec
BY
Christel & Bean
ATTORNEYS.

Dec. 24, 1968  J. R. ALBERT ET AL  3,417,432
APPARATUS FOR EXTRUDING COMPOSITE BLOW MOLDING PARISONS
Filed Aug. 27, 1965  4 Sheets-Sheet 2
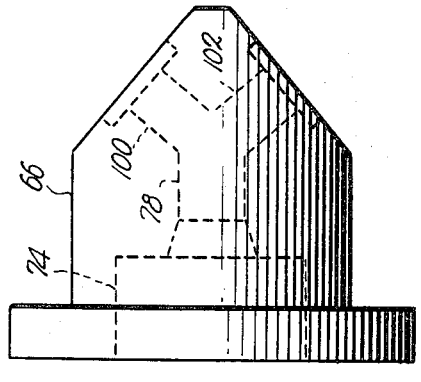
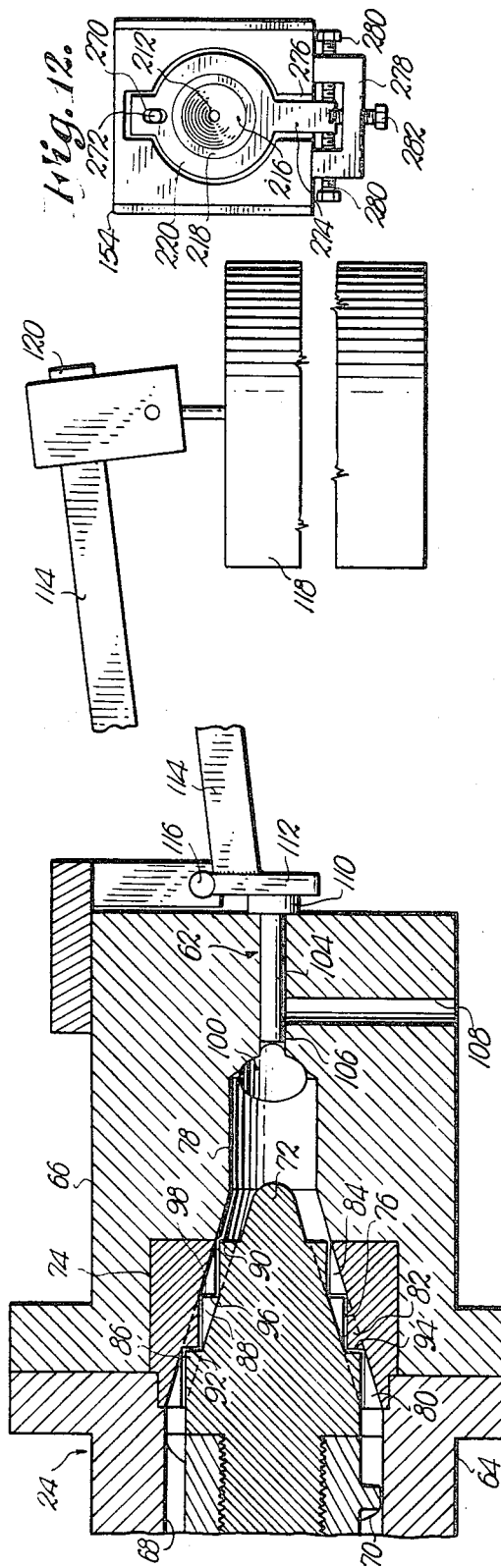
INVENTORS
John R. Albert
Michael J. Grebowiec
BY
Christel & Bean
ATTORNEYS Dec. 24, 1968   J. R. ALBERT ETAL   3,417,432
APPARATUS FOR EXTRUDING COMPOSITE BLOW MOLDING PARISONS
Filed Aug. 27, 1965   4 Sheets-Sheet 3

INVENTORS
John R. Albert
Michael J. Grebowiec
BY
Christel & Bean
ATTORNEYS

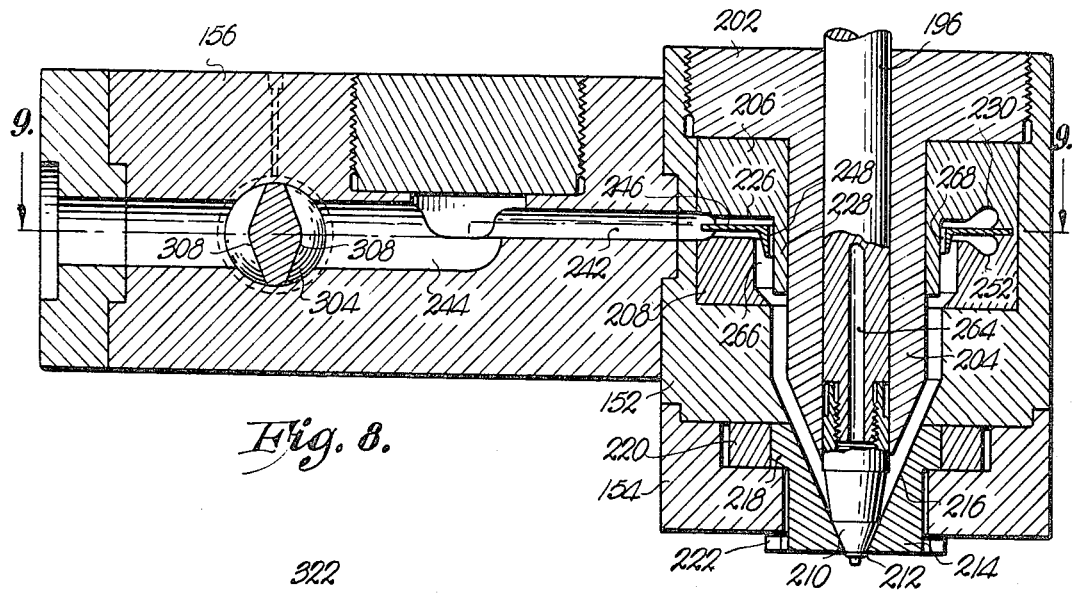
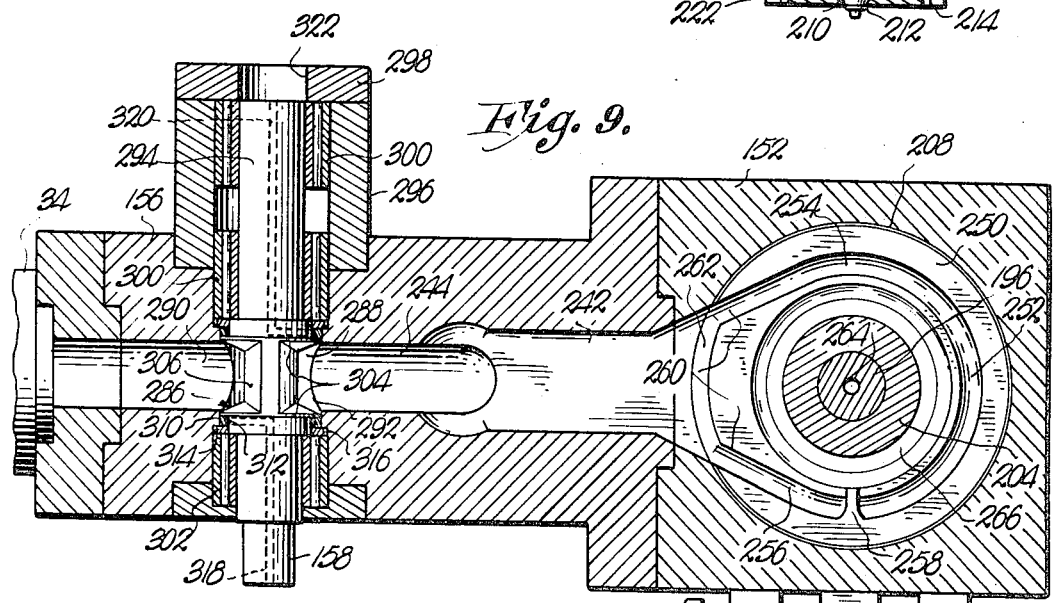
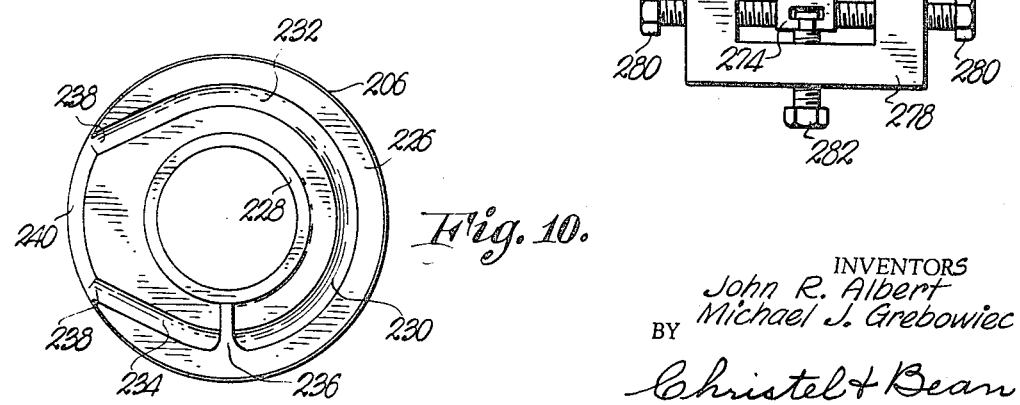

United States Patent Office 3,417,432
Patented Dec. 24, 1968

3,417,432
APPARATUS FOR EXTRUDING COMPOSITE
BLOW MOLDING PARISONS
John R. Albert, Leawood, and Michael J. Grebowiec,
Shawnee Mission, Kans., assignors to Brockway Glass
Company, Inc., Brockway, Pa.
Filed Aug. 27, 1965, Ser. No. 483,204
4 Claims. (Cl. 18—14)

ABSTRACT OF THE DISCLOSURE

A plastic blow molding apparatus wherein plastic from an extruder passes through a homogenizer and thence through radiating conduits, each conduit terminating at a molding station. A rotatable valve in each branch conduit with the several valves synchronized to permit substantially continuous movement of plastic from the extruder. Each molding station has a pair of concentric annular extrusion orifices for producing telescoping tubular plastic extrusions which are then passed through a single extrusion orifice to produce a single homogeneous tubular extrusion, the two component tubular extrusions having offset joint lines therealong.

---

This invention relates to improvements in apparatus for blow molding plastic to provide increased efficiency of operation of the molding apparatus, reduce operational and maintenance costs, eliminate unnecessary downtime caused by apparatus malfunctioning, and provide an improved plastic product having greater strength and durability.

Machines for blow molding plastic commonly employ an extruder for admixing the plastic material and any pigment that is to be utilized to give the molded product a desired color. To assure uniform pigmentation and produce a homogeneous plastic mass for molding, it has been the practice to provide an extruder tip having sets of teeth which are shifted relative to one another while in contact with the plastic mass to thereby effect the mixing function. Although this approach has proven satisfactory, problems frequently occur when a back pressure builds up in the plastic distribution lines which lead to the molding stations. Under such conditions, the pressure transmitted back to the extruder tip exerts a substantial force thereon which can cause shifting of the moving parts of the tip in their bearings and produce undesired tooth-to-tooth contact, resulting in shearing of the teeth and permanent damage necessitating complete shutdown of the apparatus for repairs.

It is, therefore, an object of this invention to provide a homogenizer for use with plastic blow molding apparatus which will not be subject to the above-mentioned tooth intermeshing problem under high back pressure conditions.

As a corollary to the above, it is another object of the instant invention to provide such a homogenizer which is constructed and arranged to respond to high back pressures in a manner which assures the maintenance of desired clearance between the material mixing teeth thereof.

Still another object of the invention is to provide a homogenizer as aforesaid which will subject the plastic or other material to shearing stresses and simultaneously compress the material into a homogenous mass.

Besides the provision of improved means for homogenizing the plastic material prior to blow molding thereof, the instant invention is also directed to an improved plastic molding station which forms the plastic in a manner to eliminate the line of weakness in the molded product which is produced by conventional molding methods. In apparatus of the prior art, the plastic is formed into a tube by a molding head and permitted to gravitate around a mandrel guide to a position between a pair of molding dies, whereupon air under pressure is introduced into one end of the tube to expand the latter in the die. Since only a single plastic tube is formed by the molding head, a weld line or seam is necessarily produced extending longitudinally of the tube, resulting in the presence of a line of weakness in the finished product after expansion in the molding die.

It is, therefore, another object of the instant invention to provide apparatus for producing a pair of concentric, tubular sheaths, having individual, nonaligned weld lines, which are combined to form a composite tube prior to entry into the die.

A further object of the invention is to provide a molding station having an upper and a lower molding head which discharge respective sheaths in concentric relationship to one another through coaxial annular openings.

Still another object of this invention is to provide a pair of molding heads as aforesaid which are disopsed in opposed relationship to one another and have a divider therebetween for splitting the incoming plastic into a pair of streams and directing said streams to respective heads.

Other aims of the instant invention are to provide an improved valve for controlling plastic flow to a molding station; to provide a ball joint connection between the main plastic supply line and each secondary line leading to a molding station; to provide novel means for centering the mandrel in the molding statioin; and to provide a safety valve for relieving excessive back pressure at the homogenizer outlet.

With reference to the above-mentioned plastic control valve, it is noteworthy that a specific object of this invention is to provide such a valve that will not foul the bushings or bearings utilized to journal the valve operating shaft in the valve body when leakage occurs around the valve member. This will occur due to the pressure in the plastic distribution lines. Thus, it is an additional object of the invention to provide a means for recovering the leakage free from contamination by the valve bushings or bearings and, therefore, in a condition for subsequent reuse without waste.

In the drawings:

FIGURE 1 is a diagrammatic illustration of the complete blow molding apparatus;

FIG. 2 is a central, vertical sectional view of the homogenizer;

FIG. 3 is a top plan view of the homogenizer housing;

FIG. 4 is a fragmentary, detailed, elevational view of the female part of the homogenizer;

FIG. 5 is a detailed, elevational view of the male part of the homogenizer;

FIG. 6 is a fragmentary, central, horizontal section showing a ball joint connection between the main plastic distribution line and a secondary line;

FIG. 8 is a central, vertical sectional view showing the plastic flow control valve and the tube forming portion of the molding station;

FIG. 9 is a horizontal sectional view taken along line 9—9 of FIG. 8, the divider ring being removed and certain components shown in plan for clarity;

FIG. 10 is a detailed, bottom view of the upper molding head;

FIG. 11 is a vertical sectional view of the plastic control valve looking toward the molding station or rightwardly as viewed in FIGS. 8 and 9;

FIG. 12 is a plan view of the lower plate and centering ring of the molding station;

FIG. 13 is a cross-sectional view of the plastic tube formed by the molding heads and the mandrel.

Figure 7:
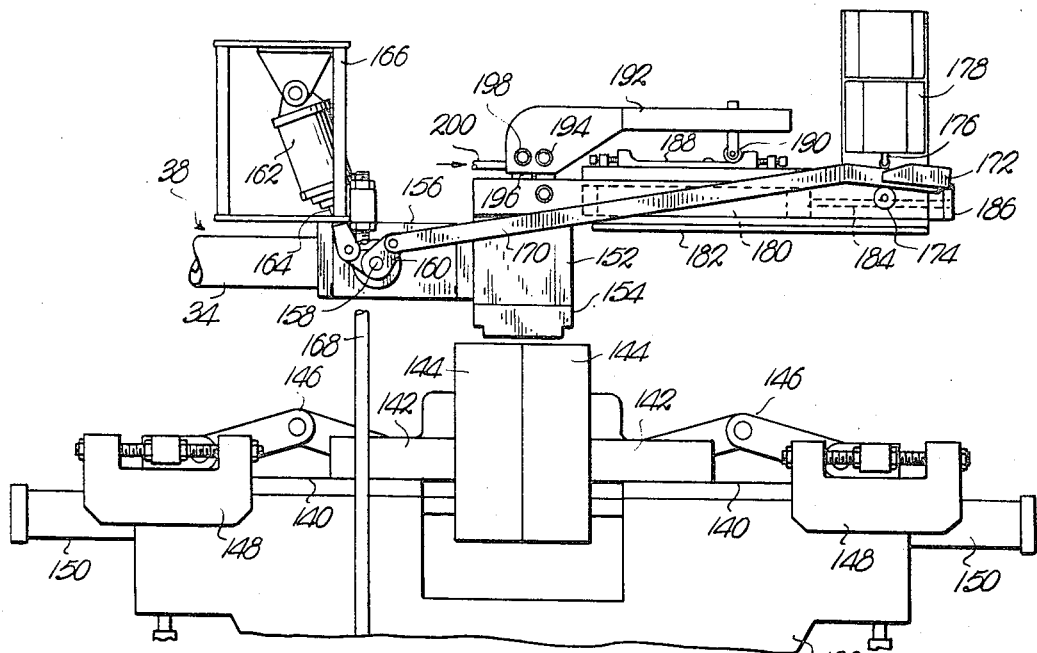
FIG. 7 is a front, elevational view of one of the molding stations.

*The homogenizer, safety valve and distribution system*

Referring to FIG. 1, the numeral 20 denotes a conventional extruder utilized in plastic blow molding, such extruder being provided with a hopper 22 for receiving plastic pellets or the like. The extruder contains heating means which subjects the solid pellets to sufficient heat to convert the same to the fluid state so that a flowing plastic mass is formed within the extruder. Pigment is also introduced into hopper 22 to give the plastic a desired color.

The heated plastic mass is fed to a homogenizer 24 which thoroughly admixes the plastic and the pigment prior to feeding of the same under pressure to a pair of main distribution lines 26 and 28. Main line 26 is provided with a pair of ball joint connections 30 and 32 coupling the same with secondary lines 34 and 36. The secondary lines 34 and 36 lead to molding stations 38 and 40 respectively. The end of line 26 remote from homogenizer 24 is directly connected with a third molding station 42 by a ball joint connection 44.

A similar arrangement exists for main line 28, the latter being coupled with a pair of secondary lines 46 and 48 by ball joint connections 50 and 52 respectively. Secondary lines 46 and 48 feed molding stations 54 and 56, the end of line 28 remote from homogenizer 24 being directly connected to a molding station 58 by ball joint connection 60. A safety relief valve 62 is shown coupled to homogenizer 24 at the junction of main lines 26 and 28, such valve being employed to relieve back pressure at the homogenizer should the same reach an excessive value.

Homogenizer 24 is shown in detail in FIG. 2. A tube 64 extending from the housing of extruder 20 is joined to a block 66 which forms the housing of homogenizer 24. Tube 64 is provided with a bore 68 which extends longitudinally of extruder 20 beneath hopper 22 and receives the plastic and the pigment fed into the hopper, while in bore 68 the plastic is subjected to heat and slowly advanced along the bore by a rotating auger 70. A tapered element 72 is threaded into the auger shaft and axially aligned therewith to present a cone-like tip extending from the end of the auger.

An insert 74 in block 66 abuts tube 64 and has a generally frustoconical opening therethrough receiving element 72 to form a material passage 76 communicating bore 68 with a bore 78 in block 66. Bore 78 is of lesser diameter than bore 68 and is coaxially aligned therewith to form a continuation of bore 68 after passage of material through the restriction presented by insert 74.

It will be appreciated that element 72 and insert 74 form, respectively, the male and female parts of the homogenizer, insert 74 being provided with three circular rows of teeth 80, 82 and 84 in concentric alignment and axially spaced, as shown in FIG. 2. Teeth 80 are eighteen in number, there being sixteen teeth 82 and ten teeth 84. Similarly, element 72 is provided with three rows of external teeth 86, 88 and 90, numbering 18, 16 and 10 respectively.

In FIG. 2 it may be seen that the teeth 86 of element 72 present vertical surfaces 92 lying in a common plane extending orthogonally of the common axis of bores 68 and 78. Similarly, the teeth 82 of insert 74 present vertical surfaces 94 lying in a common plane extending orthogonally of the common axis of the bores. Thus, when the opposed teeth 86 and 82 are in alignment as illustrated, the passage 76 therebetween is narrowed to a short, vertical stretch defined by the surfaces 92 and 94 of the opposed teeth.

Teeth 88 and 84 of element 72 and insert 74 are likewise arranged and present vertical surfaces 96 and 98, respectively. It will be appreciated, however, that the horizontally opposing teeth of element 72 and insert 74 are unequal in number so that, as shown, the various vertical surfaces will not simultaneously move into direct opposition. For example, the particular surfaces 96 and 98 shown in FIG. 2 are not in direct opposition since the two pairs of teeth 84 and 86 there shown are revealed in elevation.

Bore 78 feeds material from the homogenizer into a pair of branch passages 100 and 102 (FIGS. 2 and 3) which communicate with main lines 26 and 28, respectively. Safety relief valve 62 includes a pin 104 slidably received in an opening 106 communicating with bore 78 between branch passages 100 and 102. A relief hole 108 extends upwardly from the underside of block 66 and intersects opening 106, the hole being normally blocked by the presence of pin 104.

Pin 104 is provided with a head 110 which bears against the endpiece 112 of an arm 114. A pivot pin 116 is rigid in endpiece 112 and pivotally mounts arm 114 for swinging movement in a counterclockwise direction (as viewed in FIG. 2) upon rightward movement of pin 104. A weight 118 is coupled with the outer end 120 of arm 114 to normally maintain the arm and the pin in the positions shown.

It will be appreciated that pin 104 and its associated structure operate when the back pressure in bore 78 reaches a predetermined maximum value determined by the mass of weight 118. When pin 104 shifts a sufficient distance to the right, as viewed in FIG. 2, relief hole 108 is opened to permit discharge of plastic from bore 78 to relieve the excessive pressure therein.

Referring to FIG. 6, one of the ball joint connections 30 is there shown in detail. It should be understood that the other connections 32, 44, 50, 52 and 60 utilized in the system are identical to that as shown in FIG. 6.

Secondary line 34 is provided with a block 122 at the end thereof adjacent main line 26, block 122 having a central passage 124 therein communicating with the secondary line and intersecting a central passage 126 in a block 128 interposed in main line 26. Passage 126 registers with the main line as illustrated, it being evident that neither of the blocks 122 nor 126 impede the flow of material through the respective lines.

Block 122 presents a flat face 130 having a dome-shaped projection 132 thereon presenting a convex, spherical surface which is received by a mating recess in face 134 of block 128. Cap screws 136 extend through block 128 and are threadably received by tapped holes in block 122 so that, upon tightening of screws 136, faces 130 and 134 are drawn toward one another. It is evident that loosening of screws 136 permits a movement of secondary line 34 to adjust the same to the particular disposition of its associated molding station 38 to facilitae the layout of the various subassemblies of the apparatus. Subsequent tightening of the screws seats the arcuate mating surfaces to form a leak-free connection.

*The molding station*

Referring to FIG. 7, the molding station 38 illustrated diagrammatically in FIG. 1 is shown in front elevation, it being understood that the other molding stations are identical in construction and function. A base 138 is provided with a pair of aligned, horizontal tracks 140 which carry slide blocks 142 rigid with a pair of opposed die sections 144. A pair of linkages 146 are pivotally coupled with respective slide blocks 142, the ends of linkages remote for the slide blocks being pivotally connected to adjustable end supports 148. A pair of double-acting pneumatic cylinders 150 extend from the sides of base 138 as shown and operate to move the die sections 144 toward and away from one another. The footing of base 138 is not shown.

A mandrel and molding head housing 152 is disposed above die sections 144 and is provided with a lower plate 154. A valve body 156 is secured to the left side of housing 152 and has an operating shaft 158 projecting forwardly therefrom. A crank 160 is connected to shaft 158, crank 160 being operably coupled with a double-acting pneumatic cylinder 162 by a piston rod 164. Cylinder 162 is suspended from framework 166, the latter and valve body 156 being supported in part by an upright brace 168.

An arm 170 is pivotally connected to crank 160 at one end thereof, the other end of the arm being provided with a cam 172 which rides over an idler 174. Cam 172 is disposed to engage the actuator 176 of solenoid-operated, hydraulic valve 178 which controls the flow of hydraulic fluid to a double-acting hydraulic cylinder 180 carried by a bracket 182 rigid with and extending laterally from housing 152. The piston rod 184 of cylinder 180 has its free end rigidly secured to an end plate 186 forming a part of bracket 182.

The cylinder 180 carries a cam 188 which is engageable with a cam follower 190 depending from a lever arm 192 having a fulcrum at 194. The upper extremity of a mandrel 196 is visible in FIG. 7 between bracket 182 and the left end of lever arm 192, the latter being pivotally coupled with mandrel 196 at the upper extremity thereof for communicating the mandrel with a source (not shown) of air under pressure during the blow molding operation. The end of the secondary line 34 may be seen communicating with valve body 156 at the left side thereof.

FIGS. 8–12 show the portions of the molding station of interest in detail. Mandrel 196 is reciprocably mounted in the central bore of a mandrel guide 202 threaded into the top of housing 152. Mandrel guide 202 extends downwardly through housing 152 in the form of a cylinder 204 of reduced diameter having a tapered, lower end. An upper molding head 206 receives cylinder 204 and is seated between the cylinder and the housing 152. A lower molding head 208 is also seated in the housing below the upper head 206 and above the lower extremity of the cylinder 204.

Mandrel 196 has a tapered, lower extremity 210 which, in the position shown, projects through an orifice 212 in the bottom of a receiver 214. Receiver 214 has a conical passage 216 therethrough receiving extremity 210 and is provided with an annular flange 218 which overlies an annular shoulder formed in lower plate 154. A centering ring 220 surrounds flange 218 and is utilized to center the mandrel in a manner to be explained hereinafter. A bifurcated paddle 222 is disposed beneath lower plate 154 and is vertically reciprocable by a single-acting pneumatic cylinder 224 (FIG. 14) to dislodge the molded product after the blow molding operation.

The upper head 206 presents a horizontal face 226 and has a depending, cylindrical neck 228. A flow channel or groove 230 comprising a pair of segments 232 and 234 separated by a web or stop 236. The ends 238 of channel 230 communicate with a beveled edge 240 of head 206, edge 240 being registered with a gate 242 which, in turn, is in fluid communication with a passage 244 in valve body 156.

A divider ring 246 is clamped between heads 206 and 208 as shown in FIG. 8 and is provided with a depending, annular flange 248. Divider ring 246 serves to split the stream of fluid plastic entering the heads from gate 242 and provide a pair of flow paths for the plastic to the respective molding heads. It should be noted that both of the heads are generally cylindrical in configuration and that channel 230 of head 206 substantially encircles neck 228 in concentric relationship thereto.

In like, fashion, the lower molding head 208 presents a horizontal face 250 having a flow channel 252 or groove therein divided into a pair of segments 254 and 256 by a web or a stop 258. The ends 260 of channel 252 communicate with a beveled edge 262 of head 208, edge 262, in turn, being in fluid communication with gate 242. An air passage 264 extends axially through mandrel 196 and communicates at its upper end with air line 200 (FIG. 7).

Lower head 208 has a central, circular aperture 266 extending downwardly therethrough which forms a tubular passage for plastic flow around neck 228 and the lower, cylindrical portion 204 of mandrel guide 202. (For clarity of illustration, both the divider ring 246 and the upper head 206 are removed from the sectional view of FIG. 9.) The neck 228 of upper head 206 and the flange 248 of ring 246 define an annular opening 268 for passage of plastic from the upper head downwardly along cylinder 204. Thus it will be appreciated that the annular opening 268 and the annular aperture 266 form concentric flow paths for the plastic as the same is discharged from the flow channels of the heads. It is noteworthy that approximately one-fourth to one-third of the annular flange 248 is of reduced width, this reduced portion being located on the right-hand side of neck 228 as viewed on FIG. 8. Additionally, it should be understood that the heads 206 and 208 are disposed with their channel stops 236 and 258 located in diametric opposition to one another.

In FIG. 12, the centering ring 220 is shown in detail. The ring has a slot 270 therein which receives an upstanding pin 272 rigid with plate 154. Ring 220 is provided with an extension 274 opposite slot 270 which projects radially outwardly from the ring through a groove 276 in plate 154. A U-shaped member 278 carries a pair of cap screws 280 which extend toward one another into engagement with opposed sides of extension 274. A threaded adjusting device 282 is also received by member 278 and is coupled with the end of extension 274 by a tongue and groove coupling. It will be appreciated that adjustment of screws 280 will shift ring 220 from side-to-side, while threading of device 282 will effect front-to-back movement of the centering ring. Sufficient play is left in the tongue and groove coupling of device 282 with extension 274 to permit lateral movement of ring 220 by screws 280 without binding. In this manner, mandrel 196 may be centered with respect to receiver 214 to properly align orifice 212 with the lowermost extremity 210 of the mandrel.

Referring particularly to FIGS. 8, 9 and 11, it may be seen that valve body 156 is provided with a horizontal bore 284 therethrough having a valve member or spool 286 disposed therein to form a chamber 288 at the central portion of bore 284. An inlet port 290 and an outlet port 292 communicate with opposed sides of chamber 288 and, upon operation of valve member 286 to open the valve, these ports place secondary line 34 in fluid communication with passage 244.

Operating shaft 158 is integral with one end of spool 286, a second shaft 294 being rigid with the other end of the spool and extending therefrom in opposition to shaft 158. A bearing housing 296 having a retaining plate 298 is mounted on body 156 and contains a pair of needle bearings 300 which journal shaft 294 in bore 284. A needle bearing 302 serves to journal shaft 158 in bore 284.

Spool 286 comprises a pair of spaced-apart end discs 304 which are received in bore 284 as shown. A central web 306 is integral with discs 304 and connects the same, said web extending along a diameter of the spool and presenting opposed flow surfaces 308 which converge toward one another as the ends of the diameter are approached, as is clearly illustrated in FIG. 8.

A pair of primary sealing rings 310 abut the end faces of respective discs 304 and are seated within bore 284, the circumferential periphery of each of the rings 310 being in tight, sealing engagement with the bore. The internal circular surfaces of the rings 310 are in radially spaced relationship to respective shafts 294 and 158 to define annular cavities 312. A pair of secondary sealing rings 314 abut the outer, annular surfaces of respective rings 310 and are in tight engagement with shafts 294 and 158, respectively. A pair of annular grooves 316 are defined by body 156 and the needle bearings 300 and 302 adjacent spool 286, such grooves receiving secondary sealing rings 314 and leaving an annular space between the circumferential periphery of each ring 314 and the valve body.

A relief passage 318 extends axially of shaft 158 and has a right-angle bend communicating with the cavity 312 of its associated primary sealing ring 310. Similarly, shaft 294 has a relief passage 320 extending axially thereof, registering with an opening 322 in plate 298 and having a right-angle bend communicating with the cavity 312 of its associated sealing ring 310.

Valve body 156 is provided with a pair of relief passages 324 which communicate with respective annular grooves 316 surrounding the secondary sealing rings 314. Thus, any plastic which leaks around the valve spool 286 is prevented from fouling the bearings 300 or 302 due to the relief afforded by passages 318, 320 and 324. It should be noted that primary rings 310 are composed of a material having a higher coefficient of expansion than the surrounding valve components so that, in the presence of the heated plastic, rings 310 expand and form a tight seal with bore 284. Rings 310 may, for example, be composed of copper while the remainder of the valve comprises steel alloy parts.

The apparatus control system

Figure 14:
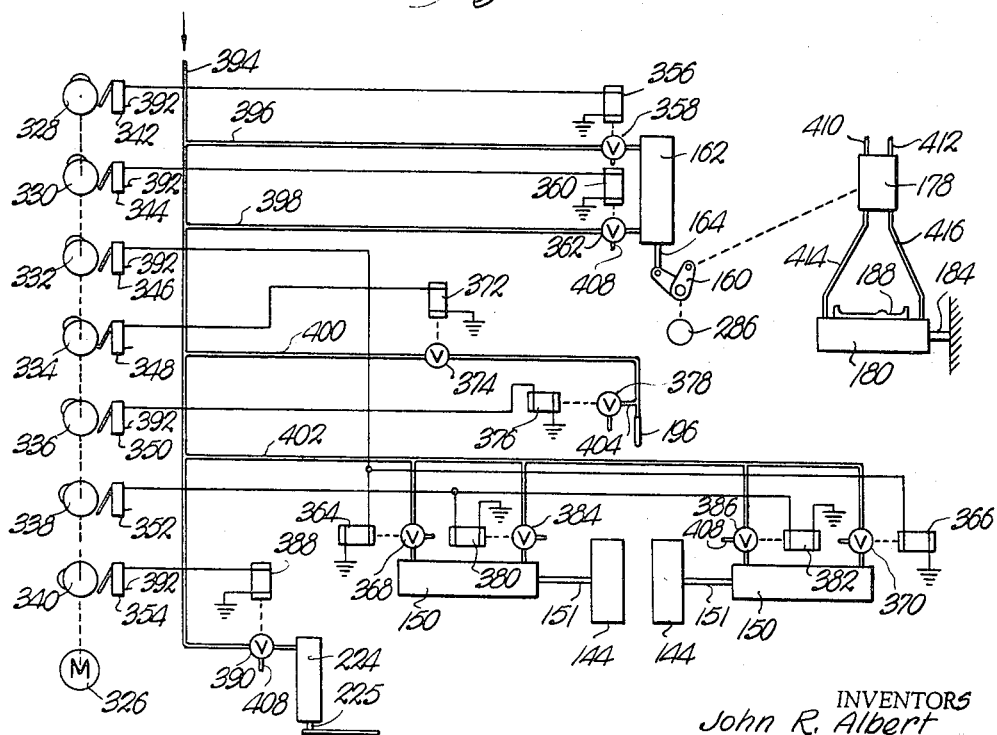
FIG. 14 is a schematic diagram of the pneumatic and hydraulic control system of the apparatus.

FIGURE 14 illustrates a suitable control system for controlling the operation of one of the plastic blow molding stations. It should be understood that six such control systems would be employed in the apparatus shown since six molding stations are utilized.

A timer motor 326 drives seven timing discs 328, 330, 332, 334, 336, 338 and 340 which are provided with cam surfaces relatively disposed in the relationship indicated. Motor 326 drives the timing discs 328–340 in a clockwise direction to sequentially place their cam surfaces into engagement with the actuator arms of cam switches 342, 344, 346, 348, 350, 352 and 354, respectively. Switch 342 controls the energization of the solenoid 356 coupled with a valve 358; switch 344 controls the energization of a solenoid 360 operably coupled with a valve 362; switch 346 is connected to a pair of solenoids 364 and 366 which are, in turn, coupled with respective valves 368 and 370; switch 348 controls the energization of a solenoid 372 which operates a valve 374; switch 350 is operably coupled with a solenoid 376 which controls valve 378; switch 352 is electrically connected to a pair of solenoids 380 and 382 operably coupled with respective valves 384 and 386; and switch 354 is connected with a solenoid 388 which operates valve 390. A suitable source of electrical power (not shown) is connected to terminals 392 of switches 342–354 to provide the operating current for the various solenoids.

An air line 394 is in communication with a source (not shown) of air under pressure, line 394 being provided with four branch lines 396, 398, 400 and 402. Valves 358 and 362 are interposed in lines 396 and 398, respectively, which are connected to cylinder 162 for operating the latter. Valve 374 is interposed in series with branch line 400 to control air flow therethrough to mandrel 196, valve 378 being disposed in an exhaust line 404 communicating with branch line 400 between valve 374 and mandrel 196. Valves 368 and 384 control the flow of air under pressure from branch line 402 to the left-hand pneumatic cylinder 150 which operates the left-hand die section 144, while the two valves 386 and 370 control air flow to the right-hand pneumatic cylinder 150. The two cylinders 150 are each provided with piston rods 151 operably coupled with respective die sections 144. Valve 390 is in main line 394 at the end thereof and controls passage of air to cylinder 224, the latter effecting vertical reciprocation of paddle 22 via its associated piston rod 225. Each of the pneumatic valves shown in FIG. 14 is closed when its solenoid is de-energized, and thus normally blocks the passage of air in the associated line. Additionally, it should be understood that each of the valves 358, 362, 368, 384, 386, 370 and 390 is provided with an exhaust port 408 which relieves the pressure in the associated cylinder when the valve is in the open condition.

A hydraulic fluid source (not shown) is coupled with hydraulic valve 178 via inlet line 410. The return line of the hydraulic system is in communication with outlet 412 of valve 178. Lines 414 and 416 communicate the control ports of the valve with cylinder 180. Valve 178 is a conventional device designed to communicate inlet line 410 with line 414, and simultaneously communicate line 416 with outlet 412, when the valve is in one mode of operation. Alternatively, in its other operational mode, valve 178 communicates inlet line 410 with line 416 and simultaneously communicates line 414 with the outlet 412. Valve 178 normally is in the first operational mode above described to maintain piston rod 184 extended, as illustrated in FIG. 7.

Operation

As explained earlier, plastic in pellet form is loaded into hopper 22 for heating by the extruder 20. Such plastic may take the form of any suitable synthetic resin capable of being converted into the fluid state upon heating thereof, and subsequently returned to the solid state upon cooling. Power means (not shown) drives auger 70 to force the fluid plastic mass into the homogenizer 24.

The homogenizer kneads the plastic material and thoroughly mixes the same with the pigment which is also introduced into the hopper. The restriction in the bores 68, 78 serves to compress the plastic mass while simultaneously subjecting the plastic to shearing stress by the action of the homogenizer teeth. It should be appreciated that, should excessive back pressure develop in bore 78 prior to opening of relief valve 62, the male and female parts 72 and 74 of the homogenizer will not be forced into engagement with one another because pressure against the nose of the male part or element 72 tends to increase the spacing between the opposed teeth rather than force the same into damaging engagement.

The fluid plastic is distributed through lines 26 and 28 and the secondary lines to the various molding stations as illustrated in FIG. 1. The molding stations are operated sequentially by respective control circuits as illustrated in FIG. 14, this being effected by arranging the timing discs of each control system so that a given molding station will complete its operating cycle prior to operation of the next station in the sequence.

As an example, the operation of station 38 will be described. When timing disc 328 closes switch 342, solenoid 356 is energized to open valve 358 and extend the piston rod passages 324 in valve body 156. Thus, the plastic will not foul the bearings 300 or 302 and may be recovered uncontaminated for reuse.

Gate 242 directs the flowing plastic stream into the space between heads 206 and 208, whereupon divider ring 246 splits the stream into separate components for flow through channels 230 and 252 of the heads. Since the channels are effectively blocked by stops 236 and 258, respectively, the plastic flows toward these stops from the ends 238 of channel 230 and from the ends 260 of channel 252.

Ultimately, it will be appreciated that the plastic overflows the channels and is discharged therefrom into the cylindrical passage around the cylinder 204 of mandrel guide 202. Initially, the integrity of the two stream components is maintained, since the upper stream is discharged through annular opening 268, and the lower stream is discharged through the annular portion of aperture 266 between flange 248 and the internal surface of lower head 208. Thus, the two stream components are discharged from the heads in the form of concentric, tubular sheaths which unite as they flow downwardly toward the orifice 212.

Referring to FIG. 13, the composite tube formed upon unification of the two sheaths is there depicted. The outer sheath is designated 418, the inner sheath being designated 420. A weld line or seam 422 is shown in sheath 418, weld line or seam 424 being located in sheath 420 in diametric opposition to weld line 422. These weld lines are formed by the webs or stops 236 and 258 of the heads which, as discussed above, divide each of the two flow channels into a pair of independent segments. Since the two heads are located with the stops 236 and 258 in diametric opposition relative to the axis of mandrel 196, it is evident that the weld lines 422 and 424 will bear a like relationship to one another.

The cam surfaces of timing discs 328 and 330 are so arranged that switch 342 will be reopened just prior to closure of switch 344 by disc 330. This energizes solenoid 360 to open valve 362 and return the crank 160 to the position shown. This closes the plastic control valve by returning valve spool 286 to the position illustrated, and simultaneously releases actuator 176 to operate hydraulic valve 178 and communicate lines 410 and 414. Line 416 is allowed to bleed through outlet 412 to the return line of the hydraulic system, and cylinder 180 returns to the position shown.

After closure of the plastic control valve, timing disc 332 effects closure of switch 346 to energize solenoids 364 and 366 to open valves 368 and 370. It will be appreciated that at this time, the composite plastic tube is depending from orifice 212 between the die sections 144, which are separated from one another to receive the tube. Thus, opening of valves 368 and 370 shifts the die sections 144 toward one another into engagement and traps the plastic tube therewithin.

Next, timing disc 334 closes switch 348 to energize solenoid 372 and open valve 274. This permits air under pressure to pass through the mandrel 196 and into the tube which is still in communication with the mandrel air passages 264 since the tube has not as yet been separated from orifice 212. The blow molding operation is thus effected in the conventional manner, the air pressure within the plastic tube causing expansion thereof and contact with the internal surfaces of the die. The plastic is then permitted to cool and solidify.

Following solidification, timing disc 336 effects closure of switch 350 to energize solenoid 376 and open exhaust valve 378.

Next, timing disc 338 operates switch 352 to energize solenoids 380 and 382 which, in turn, open valves 384 and 370. Since valves 368 and 386 have been reclosed, the pneumatic cylinders 150 are operated to separate the die sections 144, leaving the finished product suspended from orifice 212.

Finally, timing disc 340 effects closure of switch 354 to energize solenoid 288 and open valve 390 whereupon the single-acting pneumatic cylinder 224 momentarily extends its piston rod 225 to lower paddle 222 and dislodge the plastic product for gravitation to a chute (not shown).

In the layout of the molding apparatus, it should be understood that the scheme represented by FIG. 1 is of significance. The actual distance traveled by the fluid plastic from homogenizer 24 to each of the molding stations is the same, since the lengths of the secondary lines 34, 36, 46, and 48 are staggered as shown. This is done so that the pressure of the fluid plastic mass at each station will be the same, thereby assuring uniformity of operation of the molding stations.

Additionally, those skilled in the art will appreciate that it is necessary to maintain the plastic at an elevated temperature until actual discharge thereof from the orifice 212. Thus, electric heating elements (not shown) may be located along the various distribution lines and at the value body and mandrel housing of each station.

Having thus described the invention, what is claimed as new and desired to be secured by Letters Patent is:

1. In apparatus for blow molding plastic or the like: an extruder provided with a homogenizer including structure having a bore therein for receiving plastic to be homogenized, means for advancing said plastic through said bore in one direction of travel, said bore having a restriction therein defined by a portion of said structure and progressively diminishing the size of the bore in said direction of travel, and a tapered element rotatably mounted in said restriction and defining a passage for said plastic between the element and said portion, whereby said material is compressed during advancement through said passage, said element and said portion being provided with means for subjecting the plastic in said passage to shearing stress upon rotation of said element; at least two molding stations each provided with molding means and a valve for controlling flow of plastic to the molding means; a main distribution line in communication with the bore of said homogenizer and coupled with one of said stations for delivering homogenized plastic thereto; a secondary distribution line in communication with said main line and coupled with the other of said molding stations for delivering homogenized plastic thereto, each of said valves including a valve body having a chamber therein provided with a pair of opposed ports, one of said ports communicating with said associated line, a valve spool having a central web extending along a diameter of the spool and presenting a pair of opposed surfaces which converge as the limits of the diameter are approached, and means rotatably mounting said spool in said chamber for movement toward and away from a position where said diameter is aligned with said ports, each molding means including a pair of molding heads, means communicating with the heads and the other port of the associated valve for directing said plastic into the heads when the valve spool thereof is in said position, said heads being provided with means for discharging the plastic therefrom in the form of a pair of tubular, relatively telescoped sheaths, and means for receiving said sheaths and forming the same into a composite tube having a desired wall thickness; and means coupled with said valve spools for sequentially operating the latter to effect sequential operation of said stations.

2. The invention of claim 1, wherein is provided a ball joint connection intercommunicating said main line and said secondary line.

3. The invention of claim 1, wherein is provided a safety valve having relief passage means, a pressure responsive member disposed for movement, in response to a predetermined pressure build-up at the juncture of said bore and said main line, from a normal position blocking said passage means to a location communicating the passage means with said bore, and a weight coupled with said member and biasing the latter toward said normal position.

4. In a blow molding station for plastic or the like: a valve including a valve body having a chamber therein provided with a pair of opposed ports, a valve spool having a central web extending along a diameter of the spool and presenting a pair of opposed surfaces which converge as the limits of the diameter are approached, and means rotatably mounting said spool in said chamber for movement toward and away from a position where said diameter is aligned with said ports; means coupled with said body for communicating one of said ports with a source of plastic to be molded; and molding means including a pair of molding heads, means communicating with the heads and the other of said ports for directing said plastic into the heads when the valve spool is in said position thereof, said heads being provided with means for discharging the plastic therefrom in the form of a pair of tubular, relatively telescoped sheaths, and means for receiving said sheaths and forming the same into a composite tube having a desired wall thickness.

(References on following page)

References Cited

UNITED STATES PATENTS

| | | | |
|---|---|---|---|
| 2,810,159 | 10/1957 | Teichmann | 18—12 |
| 2,970,817 | 2/1961 | Gurley | 18—12 X |
| 3,048,890 | 8/1962 | Soubier | 18—5 X |
| 3,221,372 | 12/1965 | Lieberman | 18—14 |
| 3,310,835 | 3/1967 | Morozov et al. | 18—12 |

FOREIGN PATENTS

| | | |
|---|---|---|
| 18,633 | 10/1962 | Japan. |
| 1,175,418 | 8/1964 | Germany. |

WILBUR L. McBAY, *Primary Examiner.*

U.S. Cl. X.R.

18—5